United States Patent
Pajevic et al.

(10) Patent No.: US 11,029,695 B2
(45) Date of Patent: Jun. 8, 2021

(54) ACCELERATION CONTROLS FOR A MOBILE DRIVE UNIT

(71) Applicant: Amazon Technologies, Inc., Seattle, WA (US)

(72) Inventors: Dragan Pajevic, Arlington, MA (US); Gabriel Hebert, Waltham, MA (US); Oliver Christoph Purwin, Andover, MA (US)

(73) Assignee: Amazon Technologies, Inc., Seattle, WA (US)

( * ) Notice: Subject to any disclaimer, the term of this patent is extended or adjusted under 35 U.S.C. 154(b) by 89 days.

(21) Appl. No.: 15/934,765

(22) Filed: Mar. 23, 2018

(65) Prior Publication Data

US 2019/0294175 A1 Sep. 26, 2019

(51) Int. Cl.
*G05D 1/02* (2020.01)
*B25J 5/00* (2006.01)
(Continued)

(52) U.S. Cl.
CPC ............ *G05D 1/0223* (2013.01); *B25J 5/007* (2013.01); *B60P 1/649* (2013.01); *B62D 15/00* (2013.01); *B66F 17/003* (2013.01); *G05B 19/416* (2013.01); *G05B 19/41895* (2013.01); *G05D 1/027* (2013.01); *G05D 1/0214* (2013.01);
(Continued)

(58) Field of Classification Search
CPC ...... B25J 5/0007; B25J 9/0009; B25J 9/0021; B25J 9/1651; B60W 30/04; B60W 30/041; B60W 30/18027; B60W 30/182; B60W 40/13; B60W 50/0098; B60W 2520/105; B60W 2530/10; B62D 11/04; B60K 7/0007; B60L 15/10; B60L 15/20; B60L 15/2072; B60L 2200/40; B60L 2220/46; B60L 2240/16; B60L 2240/26; G05D 1/027; G05D 1/0214; G05D 1/0223; G05D 2201/0216; B66F 9/063; B66F 17/00;
(Continued)

(56) References Cited

U.S. PATENT DOCUMENTS 4,819,184 A * 4/1989 Jonsson ............... G05B 19/373
700/250
9,358,975 B1 * 6/2016 Watts .................. G05D 1/0011
(Continued)

FOREIGN PATENT DOCUMENTS

| | | | | |
|---|---|---|---|---|
| GB | 2267696 A | * | 12/1993 | ............... B66F 9/20 |
| JP | 2000211519 A | * | 8/2000 | |
| JP | 2001163597 A | * | 6/2001 | ............... B66F 9/20 |

OTHER PUBLICATIONS

Anderson, Wayne, "Chapter 9: Rotation of Rigid Bodies", PowerPoint(R) Lectures for University Physics (13th Ed.), (c) 2012 Pearson Education Inc., 59 pages (Year: 2012).*
(Continued)

*Primary Examiner* — Faris S Almatrahi
*Assistant Examiner* — David A Testardi
(74) *Attorney, Agent, or Firm* — BakerHostetler

(57) ABSTRACT

Motion controls for a mobile drive unit adjust linear acceleration for laden mobile drive units to decrease the likelihood of the payload tipping or bouncing off the mobile drive unit and adjust angular acceleration to reduce the risk of the drive wheels slipping while the casters align with the direction of travel.

7 Claims, 6 Drawing Sheets

(51) Int. Cl.
*B60P 1/64* (2006.01)
*G05B 19/418* (2006.01)
*G05B 19/416* (2006.01)
*G05D 1/08* (2006.01)
*B62D 15/00* (2006.01)
*B66F 17/00* (2006.01)

(52) U.S. Cl.
CPC ......... *G05D 1/0227* (2013.01); *G05D 1/0891* (2013.01); *G05B 2219/31005* (2013.01); *G05B 2219/43062* (2013.01); *G05D 2201/0216* (2013.01)

(58) Field of Classification Search
CPC .... B66F 17/003; B66F 17/006; G05B 19/416; G05B 19/41895
See application file for complete search history.

(56)  References Cited

U.S. PATENT DOCUMENTS

| | | | | |
|---|---|---|---|---|
| 10,209,682 | B1* | 2/2019 | Hebert | G05B 13/00 |
| 2004/0154871 | A1* | 8/2004 | Allerding | B66F 9/0755 |
| | | | | 187/287 |
| 2007/0080025 | A1* | 4/2007 | Yamada | B66F 17/003 |
| | | | | 187/224 |
| 2007/0084450 | A1* | 4/2007 | Oka | B66F 17/003 |
| | | | | 123/675 |
| 2008/0011530 | A1* | 1/2008 | Oka | B60W 10/02 |
| | | | | 180/306 |
| 2010/0179698 | A1 | 7/2010 | Oda et al. | |
| 2010/0204891 | A1* | 8/2010 | Biggerstaff | E02F 3/3414 |
| | | | | 701/50 |
| 2011/0029169 | A1* | 2/2011 | Kell | A61G 5/043 |
| | | | | 701/22 |
| 2011/0106388 | A1* | 5/2011 | Boeckenhoff | B60W 30/1882 |
| | | | | 701/70 |
| 2014/0277955 | A1* | 9/2014 | Eidelson | B23P 6/00 |
| | | | | 701/50 |
| 2014/0309826 | A1* | 10/2014 | Talja | B60L 15/20 |
| | | | | 701/22 |
| 2016/0297429 | A1* | 10/2016 | Watts | G05D 1/0223 |
| 2017/0045545 | A1 | 2/2017 | Pollack et al. | |
| 2017/0108871 | A1* | 4/2017 | Watts | G05D 1/0011 |
| 2017/0253283 | A1* | 9/2017 | Eidelson | B62D 51/001 |
| 2018/0072212 | A1* | 3/2018 | Alfaro | B60P 1/52 |
| 2018/0369683 | A1* | 12/2018 | Wen | G05B 13/00 |
| 2019/0202441 | A1* | 7/2019 | Suzuki | B60W 10/119 |

OTHER PUBLICATIONS

Pearson Education, "Circular Motion", Slides 4-70 to 4-124, (c) 2017 Pearson Education Inc., 55 pages (Year: 2017).*
Toyota Material Handling (Northern California), "Forklift capacity—how much do you need?", blog entry by Bill Parks on Nov. 21, 2017, 6 pages, downloaded from: https://www.tmhnc.com/blog/forklift-rated-capacity-how-to-determine-maximum-load (Year: 2017).*
International Patent Application No. PCT/US2019/023729; Int'l Search Report and the Written Opinion; dated Jun. 26, 2019; 13 pages.
International Patent Application No. PCT/US2019/023729; Int'l Preliminary Report on Patentability; dated Oct. 8, 2020; 8 pages.

* cited by examiner

ACCELERATION CONTROLS FOR A MOBILE DRIVE UNIT

BACKGROUND

The invention relates to robotic devices and methods, and more particularly to a mobile drive unit for transporting a payload.

Maintaining stability of a mobile drive unit as it moves and stops is a primary concern of drive control. For example, changes in acceleration may introduce the risk of the drive unit or its payload tilting. As another example, changes in direction may introduce the risk of the drive unit partially losing physical contact with the surface on which it is traveling. This disclosure is directed to addressing one or more of these and other problems in controlling mobility of a drive unit.

DETAILED DESCRIPTION OF ILLUSTRATIVE EMBODIMENTS

A mobile drive unit ("MDU") 10 includes a chassis assembly 12 of a vehicle, such as an autonomous or semi-autonomous robot, that supports a payload housing 14, capable of carrying a pod (or other payload) in a fulfillment center.

Figure 1:
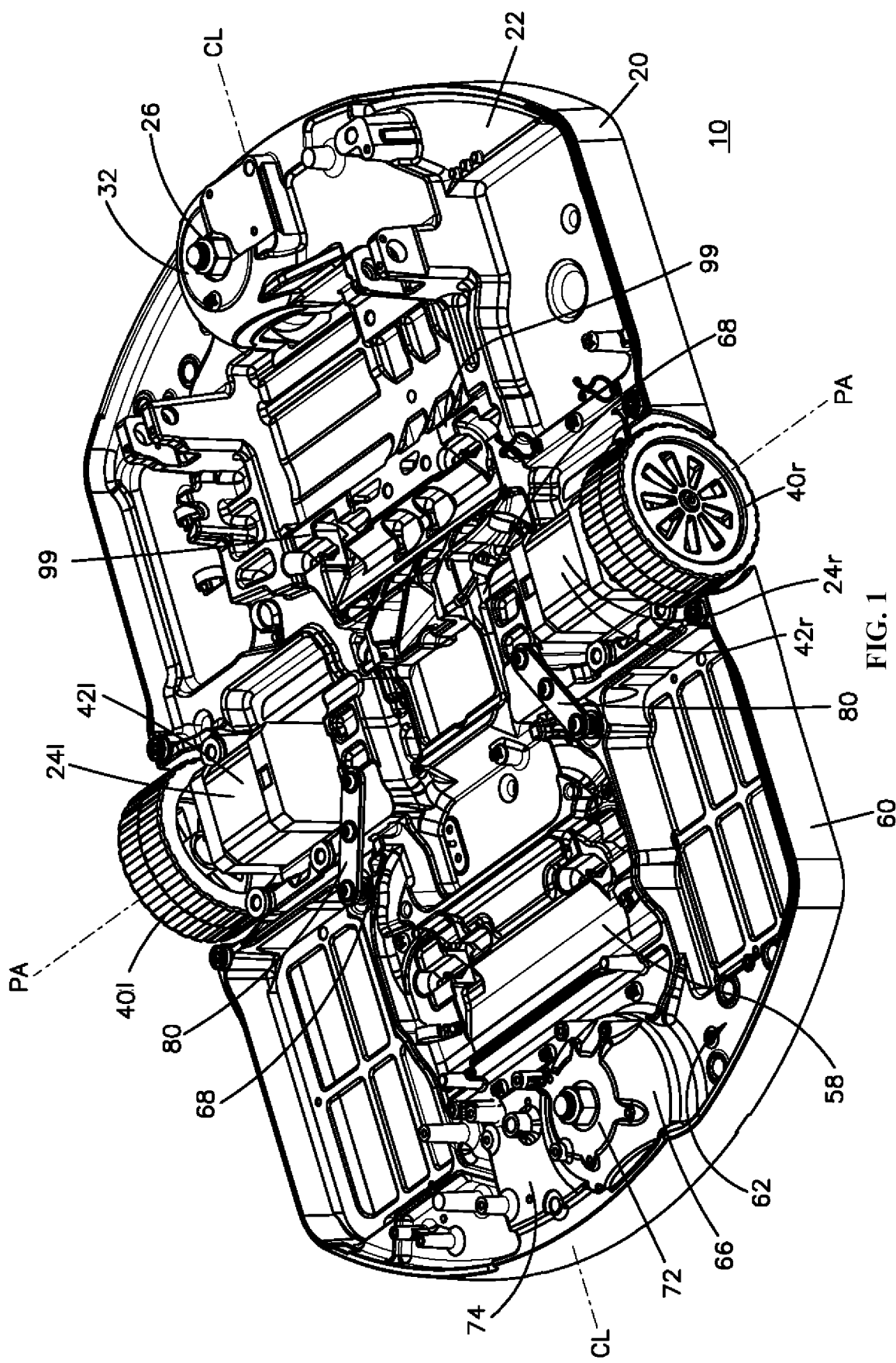
FIG. 1 is a perspective view illustrating a hinged chassis configuration of a mobile drive unit for which acceleration controls can be implemented.
Figure 2:
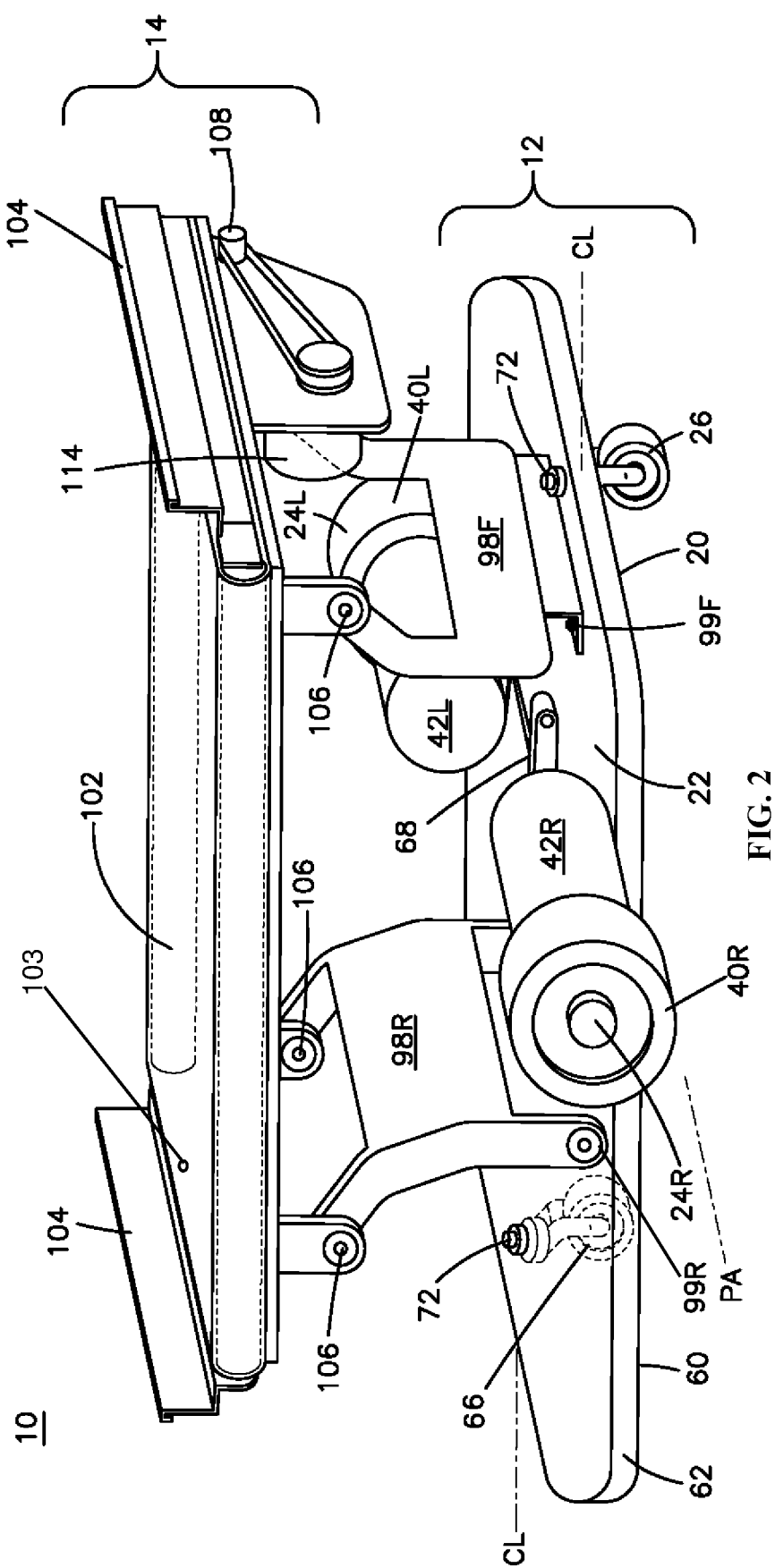
FIG. 2 is a perspective view of a mobile drive unit having a payload housing for which acceleration controls can be implemented.

Referring to FIGS. 1-2, chassis 12 is a split chassis that includes a front chassis unit and a rear chassis unit that are hinged together such that upon encountering a floor irregularity, the front and/or rear chassis can move about a pivot. The pivoting feature of chassis 12 enables the overall height of the mobile drive unit to have a diminished height compared with prior generations of like robots.

Chassis 12 of mobile drive unit 10 includes a first chassis assembly, such as front chassis assembly or unit 20, and a second chassis assembly, such as rear chassis assembly or unit 60. Front chassis assembly 20 includes a base 22, a pair of motorized wheel assemblies 24L and 24R, and a front caster 26. Base 22 in the embodiment shown in the figures is a one-piece aluminum casting to which the wheel assemblies 24L and 24R and front caster 26 are mounted. Base 22 includes mounts and cut outs for receiving the wheel assemblies 24L and 24R, and includes a recess for mounting front caster 26. Base 22 also includes a pair of pivot mounts 70, as explained more fully below.

Rear chassis assembly 60 includes a base 62 and rear caster 66. Base 62 preferably is a one-piece aluminum casting that includes a recess for mounting rear caster 66 and a recess and mount 74 for a ballast 94. Base 62 may also include a mount 58 for batteries.

A pair of pins 68 link arms to enable front base 22 and rear base 62 to pivot relative to each other. Pins 68 define a chassis pivot axis PA about which bases 22 and 62 pivot or rotate as needed. Axis PA is horizontal and transverse. Axis PA is also perpendicular to a direction of forward motion, which is illustrated in FIG. 1 by line CL, as in the embodiment shown the direction of forward motion is parallel to the centerline CL of MDU 10. Centerline CL bisects the bases 20 and 60 and is equidistant between the drive wheel assemblies 24L and 24R.

Front and rear casters 26 and 66 are mounted to base 22 and 62 (respectively)—the caster shafts extend through the base and are affixed by bolts 72. Preferably, casters 26 and 66 are conventional, and may include double wheels. Casters 26 and 66 freely pivot about the vertical axis through the shafts and are not driven. In the embodiment shown in FIG. 2, casters 26 and 66 are laterally offset from centerline CL. For example, FIG. 2 shows front caster 26 spaced apart from centerline CL to the left and rear caster 66 spaced apart from centerline CL to the right. The offset spacing enables the drive unit 8 to pass over a fiducial marker, such as a bar code or 3D code, in the floor without any of the wheels 40 or casters 26, 66 contacting the marker. Thus, the centerline CL of MDU 10 passes directly over a fiducial marker when the unit 10 drives forward.

Figure 5:
FIG. 5 is a schematic of a motion control system of a mobile drive unit.

Each wheel assembly 24L and 24R includes a conventional motor 42L and 42R (as will be understood by persons familiar with mobile drive unit technology) and a drive wheel 40L and 40R, respectively. Wheels 40L and 40R are approximately at the midpoint (fore and aft) of mobile drive unit 10. Each wheel 40L and 40R may be driven according to control signals to move unit 10 forward, or a direction of one of the wheels 40 can be reversed such that the drive unit 10 can rotate in place, by a motion control system 500 (or, "control system 500") (FIG. 5).

As shown in FIG. 1, pair of spring assemblies 80 have the function of transmitting a downward force on each one of the front caster 26 and rear caster 66, and thus spring assemblies 80 diminish the downward force on drive wheels 40L and 40R. Each spring assembly 80 includes a bracket 82 that is affixed to a rear portion of front chassis base 22 and extends rearwardly to a front portion of rear chassis base 62.

Each one of front base 22 and rear base 62 includes a support structure, support structure 98F and 98R, respectively (FIG. 2) or mounts 99F, 99R for mounting support structure 98F and 98R, respectively, as explained below and shown schematically in FIG. 1.

Support structure 98F, 98R may support a payload housing 14. Payload housing 14 can include any structure. Accordingly, support structure 98F, 98R may be any configuration and are shown only for illustration, as will be understood and can be implemented by persons familiar with mobile drive unit technology and depending on the particular parameters of the application. Different embodiments of payload housing 14 are discussed in more detail below.

Mounts 99F, 99R may have any configuration and supports that connect to mounts 99F, 99R may take any configuration, as, generally, mounts 99F, 99R encompass (without limitation) pivots and fixed structure. For example, FIG. 2 illustrates an embodiment in which front mounts 99F fixedly connect front support structure 98F to unit 22 and rear mounts 99R pivotally connect rear support structure 98R to unit 62. In other embodiments, the front mounts 99F may be pivots and rear mounts 99R may be fixed. Including a pivot mount allows a structure supported by support structures 98F, 98R to be held horizontally stable regardless of whether units 22 and 62 are not level with respect to themselves. That is, as unit 62 adjusts vertically to account for irregularities in the driving surface, pivot mount 99R can adjust accordingly.

It may be desirable to maintain horizontal stability of a top surface 102 of payload housing 14 in spite of relative vertical movement of units 22 and 62 as mobile drive unit 10 traverses uneven surfaces. FIG. 2 illustrates support structures 98F, 98R that are pivotally connected to payload housing 14 via pivots 106. For example, each support structure 98F, 98R includes two pivot mounts 106. During use, pivot connections 106 may cooperate with pivot mount 99R to allow support structures 98F, 98R to move relative to mobile drive unit 10 and payload housing 14. These pivot connections 106 do not restrict top surface 102 of payload housing 14 to stay within a plane parallel to either unit 22 or 62, but rather, allow top surface 102 of payload housing 14 to remain horizontally planar, or at least more horizontally planar than unit 22 or 62.

As discussed above, support structures 98F, 98R supports payload housing 14. Payload housing 14 in turn may support different components for securing, holding, or moving a payload. For example, payload housing 14 includes a conveyor assembly 108, including a conveyor motor 114, which can be used to move a payload. The payload may reside on top surface 102 of payload housing 14. Payload housing 14 may include one or more walls 104 that rise above top surface 102. For example, FIG. 1 illustrates payload housing 14 with two walls 104, one on each side of payload housing 14. During use, such frames 104 decrease the likelihood that the payload will bounce or slide off of the sides of top surface 102, despite any jolting or vibration caused by uneven drive surfaces.

In some embodiments, payload housing 14 may include one or more sensors 103 that detect the presence, location, or movement of a payload on top surface 102. For example, such sensors 103 may include sensors integrated into top surface 102. These sensors can be used to determine the weight or mass of a payload. As discussed in more detail below, this information can be used to control movement of mobile drive unit 10.

Figure 3:
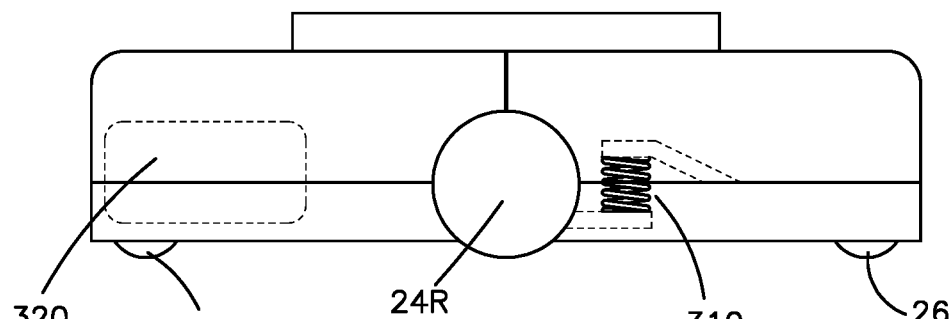
FIG. 3 is a side view of a mobile drive unit illustrating suspension and ballasts for increased stability and traction of mobile drive unit.

Mobile drive unit 10 may include one or more mechanical and/or electrical components for increasing or maintaining the stability of mobile drive unit 10 (including any payload). For example, as shown in FIG. 3, mobile drive unit 10 may include a compression spring 310 that may transfer weight from wheels 40 to casters 26 and 46 to improve drive stability. This may include, for example, transferring weight to one or both casters 26, 66.

Additionally, mobile drive unit 10 may include one or more mechanical and/or electrical components for increasing or maintaining traction of wheels 40 and/or casters 26 and 46 along a surface upon which mobile drive unit 10 travels. For example, FIG. 3 illustrates chassis 12 supporting a ballast 320 above rear caster 66. This added weight can have detrimental effects on speed of mobile drive unit 10, but may be beneficial in certain environments where, for example, the front of chassis 12 is otherwise heavier (or supports more of the weight of the payload) that could increase the risk of caster 66 losing traction with the ground surface. Depending on specific implementations and uses of mobile drive units 10, it may be beneficial to include ballast 320 above front caster 26, in addition or instead of the implementation shown in FIG. 3.

Figures 4A, 4B:
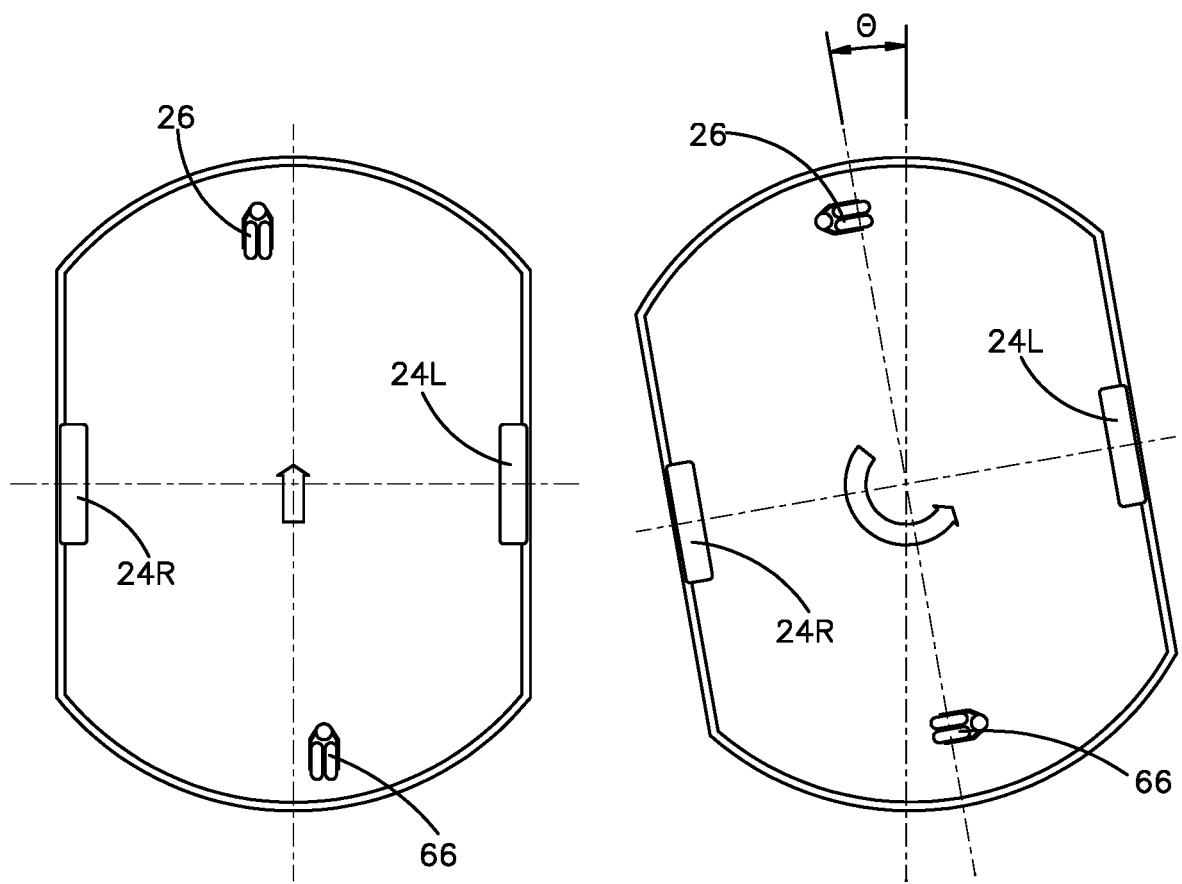
FIG. 4A is a bottom view of a mobile drive unit showing casters aligned for forward movement.
FIG. 4B is a bottom view of a mobile drive unit showing casters aligned for turning mobile drive unit.

Loss of traction can also occur as a result of turning mobile drive unit 10 based on casters 26, 66 tendency to point in the direction of travel. During forward movement, casters 26, 66 are aligned parallel to wheel assemblies 24L, 24R and line CL, as shown in FIG. 4A. As mobile drive unit 10 changes direction, the alignment of casters 26, 66 also changes. FIG. 4B shows casters 26, 66 that are not aligned with line CL, which can be the result of mobile drive unit 10 turning left. The distance (or period of time) that it takes for casters 26, 66 to realign with the direction of travel poses a risk of casters 26, 66 losing traction. Control system 500 can be used to control the movement to account for this risk, such as by decreasing acceleration for a sufficient period of time to allow casters 26, 66 to catch up with the direction of travel.

FIG. 5 is a schematic of control system 500. Control system 500 includes a processor 510 and a memory 520 storing instructions that cause the controller to effectuate operations. Such operations are discussed in more detail below. Control system 500 also includes an input/output 530, for receiving and transmitting data. For example, control system 500 communicates with motors 42 to control their movement, and with sensor 106 to receive sensor data. Control system 500 may also communicate with or be a part of other control systems of mobile drive unit 10.

Control system 500 may control movement of mobile drive unit 10. Control system 500 allows for mobile drive unit 10 to make at least the following movements: drive forward, drive in reverse, turn left 90 degrees, turn right 90 degrees, turn 180 degrees, and stop. Control system 500 also performs additional operations to decrease the likelihood that any of the foregoing movements will cause mobile drive unit 10 and/or its payload from losing stability. Stability may be defined as payload maintaining full contact with top surface 102 (e.g., not tilting or bouncing) and as wheels 40 and casters 26 maintaining full contact with a ground surface along which mobile drive unit 10 is driving, such that casters 26 rotate consistently with wheels 40, rather than skid, skip, or jump.

The operations for maintaining stability include laden linear acceleration controls and angular acceleration controls. Laden linear acceleration controls are used to adjust acceleration for mobile drive unit 10 while it is carrying a payload (e.g., laden), to increase the likelihood of payload stability while mobile drive unit 10 is accelerating. Angular acceleration controls—which can be used whether or not mobile drive unit 10 is laden—are used to allow casters 26 to realign with the direction of travel of mobile drive unit 10. Each type of acceleration control may be implemented on the same mobile drive unit 10, while other mobile drive units may implement one or the other, depending on the particular usage needs of the drive unit.

The acceleration controls are used by control system 500 to modify motion parameters on the fly. Control system 500, or another system of mobile drive unit 10, generally uses motion parameters to control movement of mobile drive unit 10. Such parameters may include default settings, such as a default acceleration (e.g., a linear acceleration value and an angular acceleration value) and velocity parameters. Motion parameters may also include trip-specific instructions, such as an instruction for mobile drive unit 10 to travel to a particular destination, or to take a particular route. In some circumstances, it may be sufficient for mobile drive unit 10 to only consider basic motion parameters (e.g., destination, maximum velocity) to complete a trip. However, it may be appropriate for these motion parameters to be modified or changed by the acceleration controls to increase the likelihood of successful completion of a trip.

Laden linear acceleration controls limits the maximum acceleration of mobile drive unit 10 as a function of the mass of the payload. For heavier payloads, the acceleration limits are controlled by the need for drive stability of the mobile drive unit 10. But for more lightweight payloads (that thus exert less downward force on mobile drive unit 10) the risk of payload instability defines the acceleration limits. This limited acceleration may be the permissible maximum linear acceleration, or the acceleration ceiling. This acceleration ceiling may apply to linear movement of mobile drive unit 10. Payloads having a mass under a certain limit may have the same acceleration ceiling as set by the default parameters, as the risk of the payload tilting is higher. As payload mass increases, the acceleration ceiling may lower, as the risk of a payload tilting over may decrease based on the mass of the payload.

Figure 6:
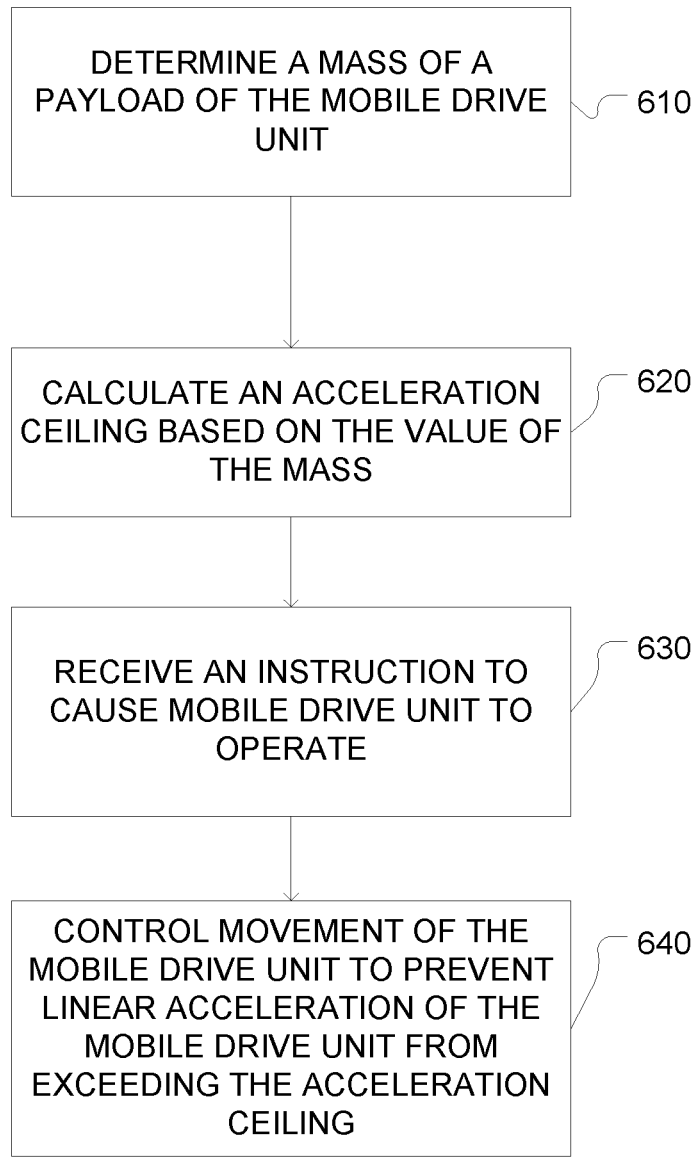
FIG. 6 is a flowchart of an exemplary method of laden linear acceleration controls.

FIG. 6 is a flowchart depicting a method 600, which may be performed by control system 500 to implement laden linear acceleration controls. At step 610, control system 500 determines a mass of a payload of mobile drive unit 10. This may include receiving data from sensor 106. Additionally or alternatively, step 610 includes receiving data from an external source, such as from a control center that controls a fleet of mobile drive units 10.

At step 620, control system 500 calculates an acceleration ceiling based on a value of the mass. This calculation may factor in different attributes of mobile drive unit 10 and/or its payload, including the coefficient of friction between top surface 102 of mobile drive unit 10 and the payload of mobile drive unit 10; the center of gravity of mobile drive unit 10, its payload, or the combination thereof; any straps or harnesses that attach the payload to mobile drive unit 10; the fragility of the contents of the payload; the velocity of mobile drive unit 10; or other factors or attributes.

For example, for one embodiment, the acceleration ceiling of mobile drive unit 10 does not change until the payload mass reaches a certain threshold. More specifically, for mobile drive unit 10, the acceleration ceiling is 1.3 meters per second squared, up until the mass of the payload is approximately 272 kilograms. When the mass of the payload is between approximately 272 kilograms and 544 kilograms, the acceleration ceiling (measured in meters per second squared) is calculated according the following equation, where the mass is equal to the mass of the payload measured in kilograms:

$$\text{linear acceleration} = 1.7 \, \frac{m}{s^2} - \frac{0.00147 \, m}{s^2 kg} \times \text{mass}$$

Under this equation, when the mass does not exceed 340 kilograms, the acceleration ceiling does not exceed approximately 1.2 meters per second squared. When the mass does not exceed 408 kilograms, the acceleration ceiling does not exceed approximately 1.1 meters per second squared. When the mass does not exceed 475 kilograms, the acceleration ceiling does not exceed approximately 1.0 meters per second squared.

Note above that the measurements—both of the payload's mass and of the acceleration ceiling—are all approximate. These approximations are used to account for minute differences in acceleration and/or mass that have negligible impact on payload stability. Further, other factors, such as the coefficient of friction between the payload and top surface 102 and others discussed above, may shift the values within ten percent.

In other embodiments, the acceleration ceiling does not exceed 1.5 meters per second squared when the mass is less than approximately 270 kilograms. As another example, the acceleration ceiling does not exceed 1.4 meters per second squared when the mass is less than approximately 340 kilograms. As another example, the acceleration ceiling does not exceed 1.2 meters per second squared when the mass is less than approximately 400 kilograms. As another example, the acceleration ceiling does not exceed 1 meter per second squared based on the mass being less than approximately 475 kilograms.

At step 630, control system 500 receives an instruction to operate mobile drive unit 10. Such instructions can include or indicate a command to drive mobile drive unit 10 forward or in reverse. At step 640, control system 500 controls movement of mobile drive unit 10 to prevent linear acceleration of mobile drive unit 10 from exceeding the acceleration ceiling. This may include, in some circumstances, not making any adjustments to the instruction received at step 630, such as if the instruction unaltered would not cause the acceleration to exceed the acceleration ceiling. In other circumstances, step 640 may include modifying the command received at step 630. Such a modification may be to simply cap the maximum acceleration of mobile drive unit 10 at the acceleration ceiling. Other modifications may include applying a multiplier to an acceleration profile indicated by the instruction received at step 630 (e.g., decreasing all acceleration values by 10%) to keep the maximum acceleration from exceeding the acceleration ceiling.

Instability can also arise during turning of mobile drive unit 10. Casters 26 are passive components whose direction and movement is dictated by movement of the motor wheel assemblies. When mobile drive unit 10 changes direction (e.g., makes a ninety degree turn), there is a slight delay before casters 26 align with the new direction of travel, increasing the risk of slip. This alignment of the casters is commonly referred to as caster-snap, and it creates additional frictional resistance that must be overcome by the drive wheels. In some cases this additional caster-snap resistance, in addition to normal inertial forces, may cause the drive wheels to lose traction. By accounting for the directional differences in a previous movement and the next movement of mobile drive unit 10, adjustments can be made to the angular acceleration to allow for casters 26 to properly align with the direction of travel without the drive wheels slipping. By reducing angular acceleration for the duration of caster-snap, the drive effectively reduces inertial forces, thereby requiring less traction to conduct the maneuver.

For example, this reduction in inertial forces may be represented by the equation $$T = I \times \alpha$$

where T is the torque induced on drive unit 10 during angular acceleration, generated by traction at drive wheels, I is the moment of inertia of drive unit 10, and a is the angular acceleration.

Figure 7:
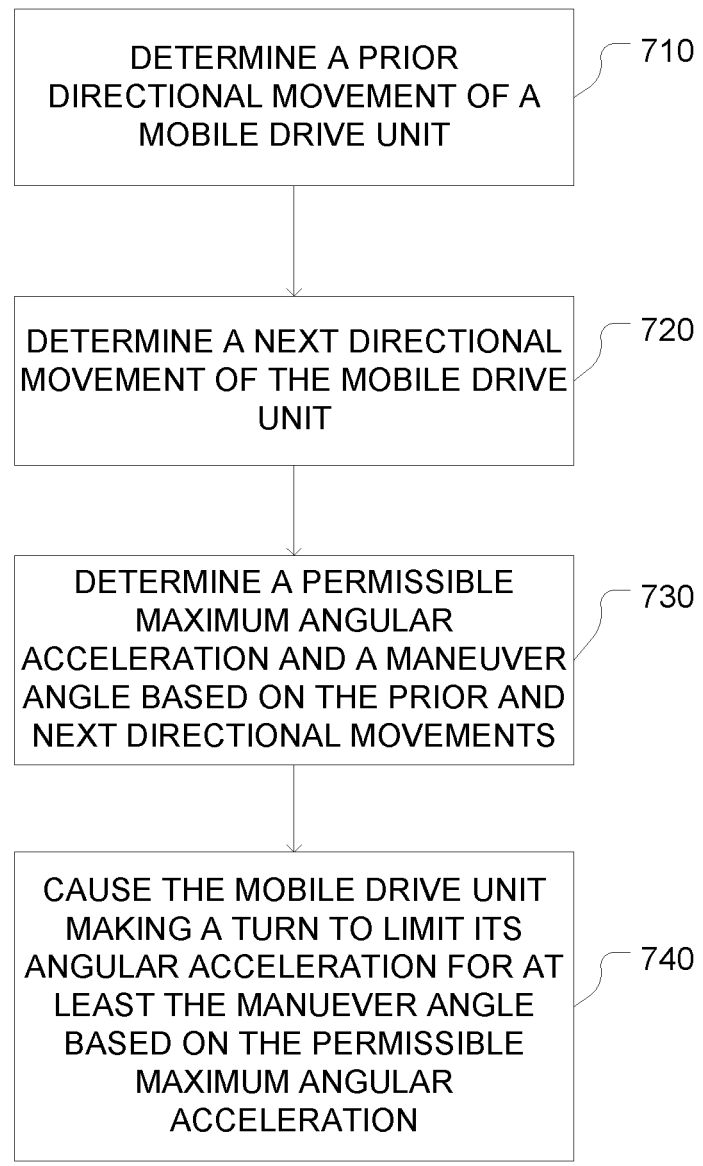
FIG. 7 is a flowchart of an exemplary method of angular acceleration control.

FIG. 7 is a flowchart of a method 700 for implementing angular acceleration controls to allow for caster alignment. At step 710, control system 500 determines a prior directional movement of mobile drive unit 10. At step 720, control system 500 determines a next directional movement of mobile drive unit 10. While these steps are separately stated, they may occur in either order, or simultaneously— i.e., control system 500 may determine a comparison of the prior directional movement and the next directional movement. The prior directional movement is indicative of a direction of front caster 26 and rear caster 26. See, for example, FIG. 4B. For example, if mobile drive unit 10 just completed a left turn, caster 26 will still be pointing towards that left direction and caster 66 will still be pointing towards the right direction. If mobile drive unit 10 just completed a right turn, caster 26 will still be pointing in the right direction and caster 66 will still be pointing towards the left direction. If mobile drive unit 10 just drive forward or in reverse, casters 26 will still be pointing forwards or backwards, respectively.

In instances where the next directional movement is in the same direction as the prior directional movement, there may not need to be an adjustment to the angular acceleration during the next directional movement, as casters 26 are already aligned in that direction. However, when the prior directional movement is different than the next directional movement, depending on what that difference is, the angular acceleration may be lowered for a certain amount of time (certain amount of degrees or traveled distance) to provide for casters 26 to align.

At step 730 control system 500 determines a permissible maximum angular acceleration and a maneuver angle based on the prior and next directional movements. The permissible maximum angular acceleration may be determined as a function of a default angular acceleration value; that is, the permissible maximum angular acceleration may be a reduced angular acceleration of the default angular acceleration. For example, if the prior directional movement and the next directional movement are the same, then the maximum angular acceleration value may be the default angular acceleration value. If the prior directional movement was linear movement, and the next directional movement is a turn, then the maximum angular acceleration value may be reduced by an acceleration reduction factor of 0.5, so that the maximum acceleration may equal 50% (or 0.5 of) the default angular acceleration value.

The prior and next directional movements also have an impact on the maneuver angle—that is, the angle for which the angular acceleration is lowered to decrease the risk of slip as casters 26, 66 align with the direction of travel. The maneuver angle θ is shown in FIG. 4B. The greater the difference between the caster direction (indicated by the prior directional movement) and the direction of the next directional movement, the larger the maneuver angle. This gives mobile drive unit 10 more time (and angular distance) for its casters 26 to properly align.

If the prior directional movement and the next directional movement are turns in the same direction, then the maneuver angle is zero (0) degrees. If the prior directional movement is a first turn in one directional and the next directional movement is a second turn in an opposite direction—that is, if mobile drive unit is making a left turn after completing a right turn, or is making a right turn after completing a left turn—than the maneuver angle is twenty (20) degrees. If the prior movement is linear—either moving forward or in reverse—and the second movement is a turn, then the maneuver angle is ten (10) degrees, as shown in FIG. 4B.

At step 740, control system 500 causes mobile drive unit 10 making a turn to limit its angular acceleration for at least the maneuver angle based on the permissible maximum angular acceleration. For example, as mobile drive unit 10 makes a ninety (90) degree turn after driving forward, control system 500 will limit its angular acceleration to fifty percent (50%) of the default angular acceleration value for the first ten (10) degrees of the turn. In some embodiments, after those ten degrees have been achieved, control system 500 permits mobile drive unit 10 to complete the remaining eighty (80) degrees of the turn at the default angular acceleration value.

The mobile drive unit includes controllers, cameras and other sensors, a docking port, a turntable, motors to lift and rotate the turntable, and the other components. A person familiar with mobile drive unit technology will understand how to mount and employ the additional components to the front and rear chassis units disclosed herein according to the particular goals and design of the mobile drive unit application.

The present invention has been described by employing a particular embodiment to illustrate particular features. For merely one non-limiting example, components are referred to as front and rear in order to illustrate the structure and function, but the invention is not limited to the particular front and rear orientations unless expressly stated in the claims. Further, the present invention is not limited to any structure or function, nor is the invention limited to any solution to any problem, described herein unless expressly stated in the claims. Nor is the invention limited in any way to embodying a benefit unless expressly stated in the claims. Rather, the structure and function described herein is merely an illustration, and the claims are intended to receive their full scope.

What is claimed is:

1. A mobile drive unit having a linear acceleration value and an angular acceleration value, the mobile drive unit comprising:
    a chassis assembly including a pair of drive wheel assemblies, each drive wheel assembly comprising a motor;
    a front caster and a rear caster each connected to the chassis assembly;
    a support structure mounted on the chassis assembly;
    a payload housing mounted on the support structure, the payload housing comprising a top surface;
    a controller communicatively coupled to the pair of drive wheel assemblies; and
    memory storing instructions that cause the controller to effectuate operations, the operations comprising:
    determining a mass of a payload located on the top surface;
    defining a permissible maximum linear acceleration based on the linear acceleration value and the mass of the payload;
    determining a prior directional movement of the mobile drive unit, the prior directional movement indicative of a direction of the front caster and the rear caster;
    determining a next directional movement of the mobile drive unit, the next directional movement indicative of a travel direction;
    defining a permissible maximum angular acceleration and a maneuver angle based on the prior directional movement and the next directional movement, wherein determination of the maneuver angle is based at least in part on the front caster and the rear caster aligned with the travel direction after completion of the maneuver angle;
    if the next directional movement comprises a turn, causing the mobile drive unit to operate at the permissible maximum angular acceleration for at least the maneuver angle; and
    if the next direction movement comprises a linear movement, causing the mobile drive unit to operate under the permissible maximum linear acceleration.

2. The mobile drive unit of claim 1, wherein the permissible maximum angular acceleration is at least fifty percent (50%) of the angular acceleration value.

3. The mobile drive unit of claim 1, wherein the prior directional movement and the next directional movement are both turns in a same direction and the maneuver angle is zero (0) degrees.

4. The mobile drive unit of claim 1, wherein the prior directional movement is a first turn and the next directional movement is a second turn in an opposite direction as the first turn and the maneuver angle is twenty (20) degrees.

5. The mobile drive unit of claim 1, wherein the prior directional movement is linear, the maneuver angle is ten (10) degrees.

6. The mobile drive unit of claim 1, wherein the payload housing comprises a sensor and the determining the mass is based on receiving data from the sensor.

7. The mobile drive unit of claim 1, wherein the permissible maximum linear acceleration equals the linear acceleration value where the mass does not exceed 270 kilograms.

* * * * *